United States Patent
Gavita et al.

(10) Patent No.: US 9,264,934 B2
(45) Date of Patent: Feb. 16, 2016

(54) METHOD AND APPARATUS FOR CONTROLLING THE TRANSMISSION OF STREAMING CONTENT IN A WIRELESS COMMUNICATION NETWORK

(71) Applicant: Telefonaktiebolaget L M Ericsson (publ), Stockholm (SE)

(72) Inventors: Edoardo Gavita, Laval (CA); Alberto Mirarchi, Montreal (CA)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 231 days.

(21) Appl. No.: 13/967,399

(22) Filed: Aug. 15, 2013

(65) Prior Publication Data

US 2015/0049602 A1 Feb. 19, 2015

(51) Int. Cl.
*H04J 1/16* (2006.01)
*H04W 28/02* (2009.01)
*H04W 4/02* (2009.01)

(52) U.S. Cl.
CPC .......... *H04W 28/0268* (2013.01); *H04W 4/028* (2013.01)

(58) Field of Classification Search
CPC ............... H04W 28/0268; H04W 28/0278; H04W 28/0284; H04L 67/2852
See application file for complete search history.

(56) References Cited

U.S. PATENT DOCUMENTS

| | | | |
|---|---|---|---|
| 7,328,262 B2 * | 2/2008 | McDonagh et al. | 709/224 |
| 8,145,969 B2 | 3/2012 | Bauchot et al. | |
| 8,238,724 B2 | 8/2012 | Jin | |
| 8,291,107 B1 * | 10/2012 | Upadhyay et al. | 709/234 |
| 8,374,115 B2 | 2/2013 | Huang et al. | |
| 8,441,955 B2 * | 5/2013 | Wilkinson et al. | 370/252 |
| 8,441,965 B2 | 5/2013 | Jazra | |
| 8,626,867 B2 * | 1/2014 | Boudreau | 709/217 |
| 8,681,622 B2 * | 3/2014 | Chatterjee et al. | 370/232 |
| 8,717,890 B2 * | 5/2014 | Kovvali et al. | 370/232 |
| 8,725,881 B2 * | 5/2014 | Pastor Balbas et al. | 709/227 |
| 8,787,331 B2 * | 7/2014 | Liu et al. | 370/338 |
| 8,805,382 B2 * | 8/2014 | Rahman et al. | 455/445 |
| 8,817,699 B2 * | 8/2014 | Liu et al. | 370/328 |

(Continued)

FOREIGN PATENT DOCUMENTS

EP 2073486 A1 6/2009
WO 2007121789 A1 11/2007

OTHER PUBLICATIONS

Curcio, Igor D.D. et al., "Geo-Predictive Real-Time Media Delivery in Mobile Environment", Proceedings of the 3rd Workshop on Mobile Video Delivery, Movid 2010, New York, New York, USA, Jan. 1, 2010, 3-8.

*Primary Examiner* — Brian O'Connor
(74) *Attorney, Agent, or Firm* — Murphy, Bilak & Homiller, PLLC

(57) ABSTRACT

This disclosure provides example details for a method and apparatus for controlling the transmission of streaming content from a wireless communication network to a wireless device, including temporarily increasing the size of a buffer used at the device for streaming content buffering and correspondingly initiating a transmission burst of the streaming content towards the device. These operations are undertaken responsive to determining that there is an expectation that a required QoS will be violated with respect to the device and among their several advantages, they lessen the likelihood that the expected QoS violation will disrupt streaming content playback at the device.

20 Claims, 6 Drawing Sheets

(56) References Cited

U.S. PATENT DOCUMENTS

| | | |
|---|---|---|
| 8,988,997 B2* | 3/2015 | Cabrera ........................ 370/230 |
| 9,031,564 B2* | 5/2015 | Teyeb et al. ................... 455/441 |
| 9,032,427 B2* | 5/2015 | Gallant et al. ..................... 725/9 |
| 2008/0005767 A1 | 1/2008 | Seo |
| 2009/0119734 A1* | 5/2009 | Deshpande et al. .......... 725/118 |
| 2010/0121977 A1 | 5/2010 | Kontola et al. |
| 2012/0009890 A1 | 1/2012 | Curcio et al. |
| 2012/0064908 A1* | 3/2012 | Fox et al. ................... 455/452.2 |
| 2012/0257499 A1* | 10/2012 | Chatterjee et al. ............. 370/232 |
| 2012/0300687 A1* | 11/2012 | Aksu et al. .................... 370/312 |
| 2013/0114408 A1 | 5/2013 | Sastry et al. |
| 2013/0142043 A1* | 6/2013 | Tapia et al. .................... 370/230 |
| 2013/0201832 A1* | 8/2013 | Kang et al. .................... 370/235 |
| 2013/0286879 A1* | 10/2013 | ElArabawy et al. .......... 370/252 |
| 2013/0298170 A1* | 11/2013 | ElArabawy et al. ............. 725/62 |
| 2014/0024383 A1* | 1/2014 | Rahman et al. ............... 455/445 |
| 2014/0148174 A1* | 5/2014 | Teyeb et al. ................... 455/441 |
| 2014/0286164 A1* | 9/2014 | Mahindra et al. .............. 370/235 |
| 2014/0347996 A1* | 11/2014 | Rahman et al. ............... 370/235 |

* cited by examiner

METHOD AND APPARATUS FOR CONTROLLING THE TRANSMISSION OF STREAMING CONTENT IN A WIRELESS COMMUNICATION NETWORK

TECHNICAL FIELD

The present invention generally relates to wireless networks and particularly relates to controlling the transmission of streaming content in a wireless communication network.

BACKGROUND

Standardization work by the Third Generation Partnership Project, 3GPP, encompasses Radio, Core Network and Service architecture and protocols. Long Term Evolution, LTE, and LTE-Advanced represent current areas of particular focus by the 3GPP, because of the ability of such networks to deliver so-called 4G data rates. LTE networks include a Radio Access Network, RAN, portion referred to as the Evolved Terrestrial Radio Access Network or E-UTRAN, and an associated Core Network, CN, portion referred to as the Evolved Packet Core or EPC.

One may refer to the document 3GPP TS23.002 for an overview of 3GPP network elements, as used in the EPC and in older, legacy CNs. For EPC details in the context of E-UTRAN access, one may refer to 3GPP TS 23.401. Of course, LTE and LTE-Advanced networks are not the only network types capable of delivering high-rate data services, such as movies, video, and media-rich web pages, and other streaming content. For example, the term "Universal Mobile Telecommunications System" or UMTS broadly refers to radio technologies developed by the 3GPP. Wideband Code Division Multiple Access, W-CDMA, was introduced as an aspect of UMTS by the 3GPP in Release 99 and Release 4, where 3GPP "releases" represent overall sets of related technical specifications. W-CDMA High Speed Packet Access, HSPA, services were added to W-CDMA in the downlink as of Release 5, and in the uplink as of Release 6. HSPA provided significant bit rate increases within the context of W-CDMA, enabling a range of new services, including streaming content services.

Broadly, then, a number of different current network types, and further generation networks now under development, make practical the delivery of rich media content via their higher data rates and more sophisticated enforcement of Quality-of-Service, QoS, and/or Service Level Agreements, SLA, for different types of packet data services, and there is particular interest in receiving streaming content via wireless devices. "Streaming content" is content that is consumed while being transferred. For example, if the streaming content is a video file, viewing begins after an initial portion of the file is buffered at a viewing device and continues as the remainder of the file is progressively transferred to the device.

To facilitate the delivery of electronic content, including streaming content, mobile network operators are turning to content caching, where one or more caches within the wireless communication network provide localized storage of content, e.g., broadband movies for on-demand delivery to wireless devices operating within the network. In a non-limiting example, the network operator caches content from one or more Content Delivery Networks or CDNs. A "CDN" may be understood generally as a collection of web servers distributed across multiple locations to more efficiently deliver content like applications, media streams or software to users.

Nonetheless, the inherent difficulties of managing wireless connections over changing reception conditions and mobility-related handovers leaves significant unresolved challenges to address in the goal of achieving seamless, high-quality delivery of streaming content via wireless communication networks. Indeed, the achievable date rate to individual devices in a given wireless communication network varies substantially as a function of numerous variables, including dynamically changing channel conditions. However, for streaming to work, the average data rate to a wireless device operating in the network has to be high enough to at least keep up with the playback rate of the streaming content, at least to the extent that the overall playback time exceeds the size of a playback buffer within the device that is used for buffering incoming streaming content for playback.

The use of playback buffers in this regard will be understood as an attempt to improve the content consumption experience. Typically, the device initiates playback after a sufficient amount of streamed content has been accumulated within its playback buffer. Then, as content is played back from the buffer, the device refills the buffer with additional content as it is received from the network. The buffer therefore reduces playback interruptions. While the disadvantages of a small playback buffer may be readily apparent, it is advantageously recognized herein that potentially significant disadvantages accompany the use of excessively large, static playback buffers.

SUMMARY

This disclosure provides example details for a method and apparatus for controlling the transmission of streaming content from a wireless communication network to a wireless device, including temporarily increasing the size of a buffer used at the device for streaming content buffering and correspondingly initiating a transmission burst of the streaming content towards the device. These operations are undertaken responsive to determining that there is an expectation that a required quality of service, QoS, will be violated with respect to the device and among their several advantages, they lessen the likelihood that the expected QoS violation will disrupt streaming content playback at the device.

In one embodiment, a method of controlling the transmission of streaming content from a wireless communication network to a wireless device includes obtaining mobility information for the device, determining from the mobility information whether or not there is an expectation that a required QoS to the device will be violated with respect to the transmission of the streaming content. The method further includes initiating a temporary increase in the size of a dynamically sizable buffer at the device that is used for buffering the streaming content, and correspondingly initiating a transmission burst of the streaming content towards the device, when there is the expectation that the required QoS to the device will be violated.

In a corresponding embodiment, a streaming-content control server is configured for controlling the transmission of streaming content from a wireless communication network to a wireless device. The streaming-content control server is implemented within the network in some embodiments, while in other embodiments it is implemented in an external network but is communicatively coupled.

In an example implementation, the streaming-content control server includes one or more communication interfaces that are configured for communicating with the device and with a source of the streaming content being transmitted to the device. Further, the streaming content control server includes a control circuit that is operatively associated with the one or more communication interfaces and configured to obtain mobility information for the device, and determine from the mobility information whether or not there is an expectation that a required QoS to the wireless device will be violated with respect to the transmission of the streaming content. In response to determining that there is an expected QoS violation, the control circuit initiates a temporary increase in the size of a dynamically-sizable buffer at the device, which is used for buffering the streaming content, and the control circuit correspondingly initiates a transmission burst of the streaming content towards the device.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
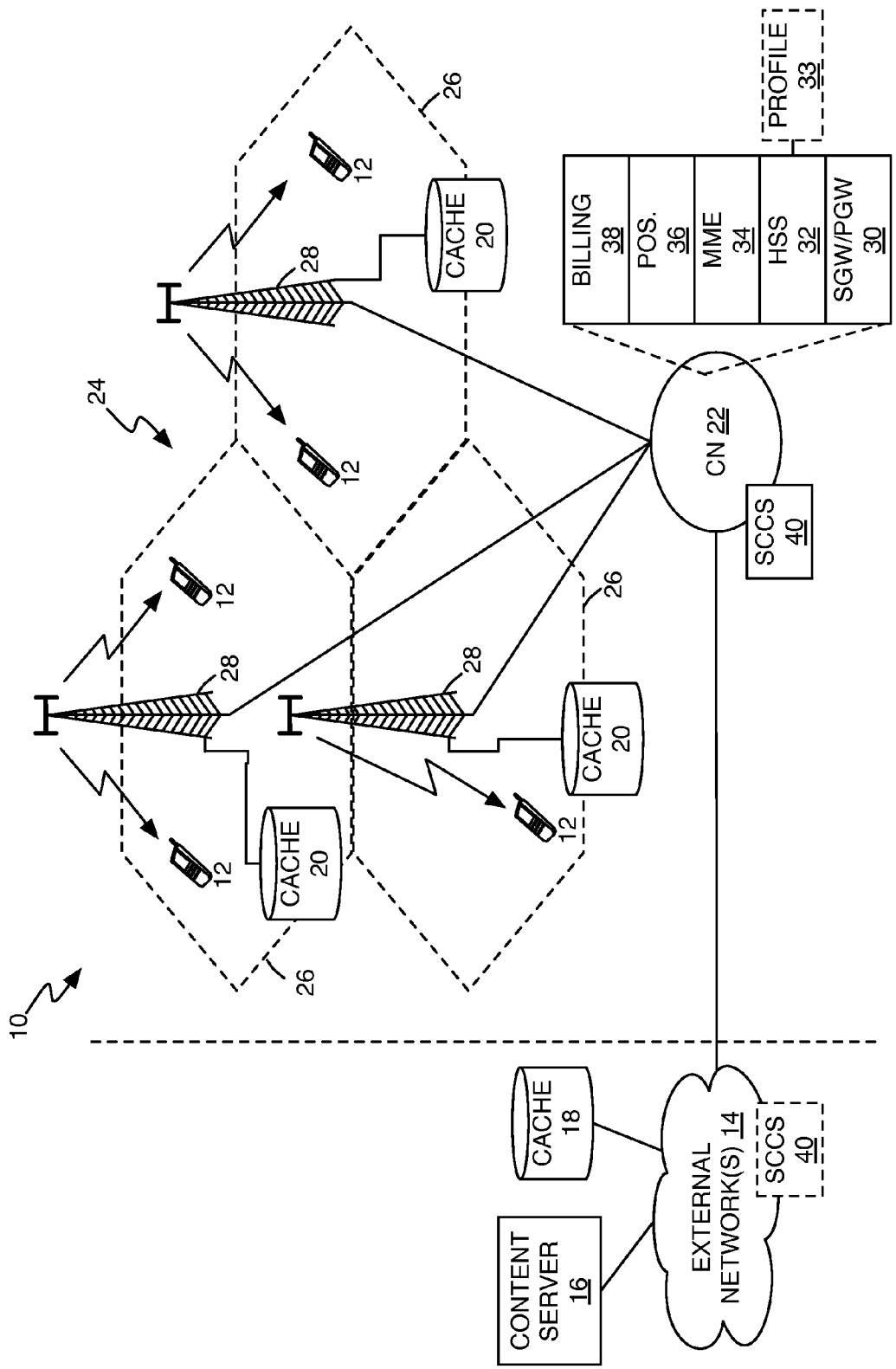
FIG. 1 is a block diagram of one embodiment of a wireless communication network that includes a streaming-content control server that is configured according to the teachings herein.

FIG. 1 illustrates an example wireless communication network 10, hereafter referred to as "network 10". The network 10 provides communication services to a potentially large number of wireless devices 12 operating within or more of its coverage areas, such as by connecting them to other devices or systems accessible through one or more external networks 14. The Internet represents an example packet data network or PDN, to which the network 10 communicatively couples respective ones of the wireless devices 12.

In this regard, the term "wireless device" should be given broad construction, and encompasses smartphones, tablets, laptop or other computers, and essentially any other wireless device or apparatus, although devices that provide mechanisms for streaming content consumption are of particular interest herein. Such a wireless device 12, hereafter "device 12", will be understood to include transceiver and related processing circuitry enabling communication according to the signal types and protocols used in the air interface offered by the network 10. For example, where the network 10 comprises an LTE or other 3GPP network, the device 12 will be configured according to the applicable 3GPP specifications.

Streaming content delivered to the devices 12 via downlink, DL, signal transmissions from the network 10 may originate from a content server 16 and/or a content cache 18 accessible via the external network(s) 14. The same or other content may be cached in one or more caches 20 that are located within the network 10. Thus, given streaming content being transmitted from the network 10 to given devices 12 may stream from an external content server 16, from an external cache 18, or from one of the network caches 20.

To the extent that the network 10 uses network caches 20 and has more than one such cache, they may be deployed in the Core Network, CN 22, of the network 10 and/or in the RAN 24 of the network 10. In the example illustration, individual network caches 20 are deployed in the RAN 24, where each network cache 20 is associated with one or more cells 26, as served by a respective base station 28. Here, a "cell" may be understood as the allocation of specific radio resources over a particular geographic area. Thus, different cells may wholly or partially overlap, e.g., where different carrier frequencies provide overlapping coverage.

In this disclosure, the cells 26 are also referred to as "service areas 26" and that broader term encompasses various cellular arrangements, including multi-sector cells, heterogeneous networks that includes different types of base stations 28 and/or other access points, such as a mix of low-power, micro base stations 28 and high-power, macro base stations. In such arrangements, the service areas 26 provided by the low-power base stations 28 may be regarded as hotspots overlaying or extending the service area 26 of a macro base station.

In an LTE embodiment of the network 10, these base stations 28 would be referred to as eNodeBs, and in a W-CDMA/HSPA embodiment of the network 10, they would be referred to as NodeBs, which would connect to the CN 22 through one or more Radio Network Controllers or RNCs. Other terminology would apply for other network types.

In other non-limiting example aspects of the illustrated network 10, one sees a number of nodes or entities implemented within the CN 22. These entities include one or more Serving Gateways/Packet Gateways, SGW/PGW 30, a Home Subscriber Server, HSS 32, a Mobility Management Entity, MME 34, a positioning node 36, and one or more billing nodes or systems 38. As will be seen in the context of one or more example embodiments, the advantageous transmission control disclosed herein for streaming content may use certain information in subscriber profiles that are associated with the devices 12 involved in the streaming. One such profile 33 is shown in association with the HSS 32, although there will generally be multiple profiles 33, with one for each of the network's subscribers.

Of particular interest herein, FIG. 1 further depicts a streaming-content control server 40, which is shown as "SCCS 40" in the diagram. In some embodiments, the SCCS 40 is located within the network 10, e.g., in the CN 22, while in other embodiments the SCCS 40 is located external to the network 10. FIG. 1 suggests this possibility by depicting the SCCS 40 as a dashed box within or in association with the external network(s) 14.

Figure 2:
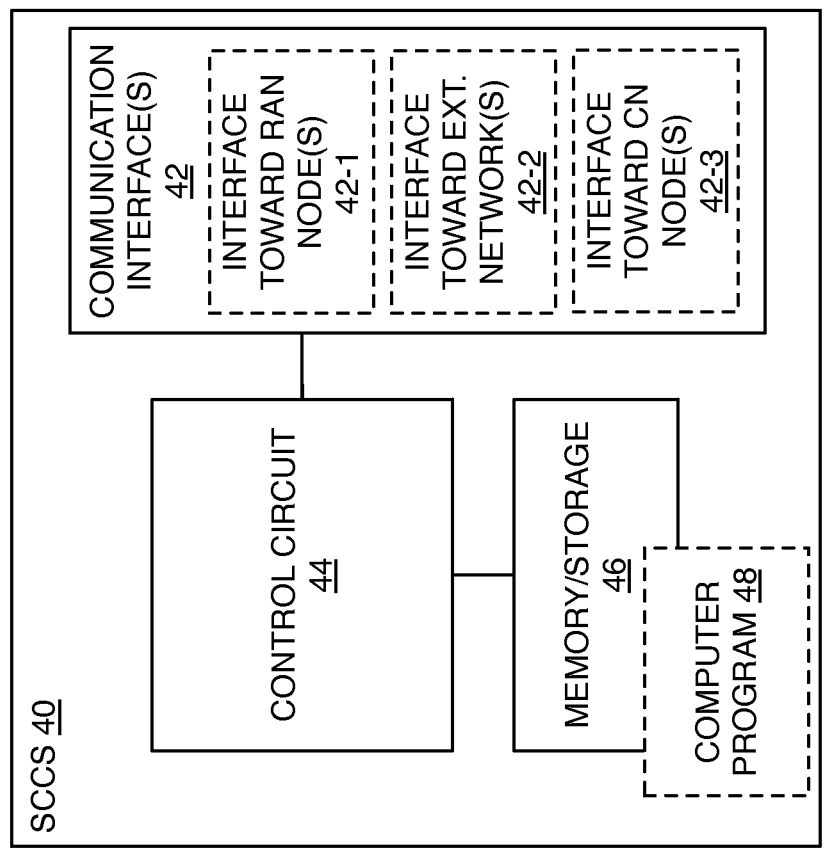
FIG. 2 is a block diagram of one embodiment of physical and/or functional processing circuits and communication interfaces, in an example implementation of the streaming-content control server.

FIG. 2 illustrates an example embodiment of the SCCS 40. The illustrated SCCS 40 is configured for controlling the transmission of streaming content from the network 10 to a device 12. Here, it will be understood that the SCCS 40 generally will have the capability of controlling streaming-content transmissions to essentially any number of devices 12 operating in any number of cells 26, but the example is simplified by the discussion of operations with respect to just one device 12.

The SCCS 40 comprises one or more communication interfaces 42 configured for communicating with the device 12, and for communicating with a source of the streaming content being transmitted to the device 12. Example sources include any one or more of the streaming content server 16 and the content cache 18 in the external network(s) 14, and the network cache(s) 20 within the network 10.

The SCCS 40 further includes a control circuit 44 that is operatively associated with the one or more communication interfaces 42 and configured to obtain mobility information for the device 12, and determine from the mobility information whether or not there is an expectation that a required quality of service, QoS, to the device 12 will be violated with respect to the transmission of the streaming content. The control circuit 44 is also configured to initiate a temporary increase in the size of a dynamically-sizable buffer at the device 12 used for buffering the streaming content and correspondingly initiate a transmission burst of the streaming content towards the device 12, when there is the expectation that the required quality of service to the device 12 will be violated.

That is, the control circuit 44 is configured such that, when it determines that there is an expectation of a QoS violation with respect to the device 12, it initiates the temporary increase in streaming-content buffer size at the device 12, and correspondingly initiates a transmission burst of the streaming content towards the device 12. This configuration offers the advantage of temporarily increasing the streaming-content buffer depth at the device 12, in the interest of increasing the likelihood that streaming-content playback will not be disrupted if the expected QoS violation does in fact occur.

At the same time, the intelligent manner in which the control circuit 44 dynamically initiates the temporary nature of the buffer size expansion and burst transmission avoids the problems that would arise from simply equipping the devices 12 with a large, fixed-size buffers. For example, that simplistic "solution" might obligate the network 10 to engage in unnecessarily high data rate transmissions toward such devices, at least until the larger, fixed-size buffers are filled, which would unnecessarily load the network 10.

In at least one example of the contemplated control circuit 44, it is configured to determine the required QoS from a subscriber profile 33 associated with the device 12. In at least one embodiment of this configuration, the subscriber profile 33 stipulates one or more QoS requirements for the transmission of streaming content to the device 12. Thus, the applicable QoS requirements may be defined expressly with respect to streaming-content delivery and/or the QoS requirements may be more general, e.g., average data rate ranges or thresholds.

Further, the network operator may monetize the streaming-content transmission control teachings herein by offering subscribers such control in return for higher subscription fees. This approach allows subscribers to pay for a more enjoyable, or at least a more reliable playback experience and may appeal to those users who are regular consumers of movies, videos or other broadband content. Of course, some operators may choose not to charge for the streaming-content transmission control feature, or they may allow users to selectively enable the feature and then charge on a usage basis.

In any case, in at least one embodiment, the control circuit 44 is configured to capture charging information for the transmission burst, including capturing one or more of: a duration of the transmission burst, a data rate of the transmission burst, and an amount of streaming content delivered during the transmission burst. In such embodiments, the control circuit 44 is further configured to provide the charging information to a billing entity 38 associated with the network 10.

The mobility information in one or more embodiments indicates a trajectory of the device 12 within the network 10, and the control circuit 44 is configured to determine from the mobility information whether or not there is an expectation that the required QoS will be violated, by determining from the mobility information that the device 12 will or is expected to imminently undergo a handover from one service area 26 to another service area 26. As an example, the mobility information indicates the last two or more service area handovers, from which direction can be deduced, or, similarly, indicates the last two or more determined positions of the device 12. Various data items, such as Cell ID listings from prior handovers, etc., all can be used as mobility information. Moreover, the control circuit 44 itself may collect or generate the mobility information, e.g., based on mobility event data from the MME 34, or it may receive it in usable form from the MME 34 or another network entity.

In the same or another embodiment, the control circuit 44 is configured to determine from the mobility information whether or not there is an expectation that the required QoS will be violated, by determining from the mobility information that the device 12 will or is expected to imminently undergo a handover from an uncongested service area 26 to a congested service area 26. Network congestion levels may be parameterized in any number of ways, such as a simple count of active-state devices 12 connected on a per service-area basis. Or more sophisticated measures of congestion may be used, e.g., by evaluating Rise-Over-Thermal, ROT, noise at the base stations 28, and/or by evaluating not only the number of connected devices 12 within the different service areas 12, but also by evaluating the types of services engaged in by those devices 12, their average and/or peak data rates, etc. In all such cases, numeric thresholds can be readily established to express the demarcation between, e.g., low congestion and high congestion.

In the same or a further embodiment, the control circuit 44 is further configured to determine from the mobility information whether or not there is an expectation that the required QoS will be violated, based on detecting from the mobility information that a potential violation of the required QoS is imminent, according to known network conditions relative to a known or expected position of the device 12, as determined from the mobility information. For example, the mobility information may indicate that the device 12 is in a location where it will or is likely to move through an area of impaired reception. More generally, the SCCS 40 may be configured with a database or have access to a database that indicates "problem" areas in the network, such as handover and/or reception areas where temporary service impairments or even service interruptions are "expected," e.g., from historic records, drive testing or other network characterizations.

The SCCS 40 may have knowledge of "black out" or "weak" areas of service coverage for the network 10. Consider an example case where commuter train tracks pass through one or more service areas 26 of the network 10, and where it is known to the SCCS 40 that a gap or impairment in network service corresponds to a particular section of track—e.g., a tunnel or narrow passage. Here, the control circuit 44 may be configured to detect from the mobility information that a subscriber is traveling by train towards the problematic service area, e.g., based on recognizing Cell IDs or position data, rate/direction of travel, or other indicators.

In this scenario, the control circuit 44 may be configured to initiate the temporary increase in streaming-content buffer size at the device 12 of the subscriber and to correspondingly initiate a burst transmission of the streaming content towards the device 12, based on detecting that entry into the problem area is imminent. As a more general example, the SCCS 40 in one or more embodiments makes the decisions based on mobility information that includes both location and telemetry of the device 12, as well as the known network factors like black out areas.

Thus, determining that a violation in the required QoS is expected may be based on detecting any one or more conditions, including these non-limiting examples: detecting that the device 12 is moving towards a cell boundary where a handover will occur; detecting from Cell IDs and/or geographic positioning information, e.g., from GPS, that the device 12 is moving towards a gap in the network's coverage area, or moving towards an area of weak or lower-rate coverage.

In addition to determining that a QoS violation is expected to occur with respect to the device 12, the control circuit 44 of the SCCS 40 in an example embodiment is configured to control one or more parameters of the transmission burst based a known or expected duration of the expected violation of the required quality of service to the device 12. For example, if the expected violation is associated with handover from a given service area 26 to a neighboring service area 26, and there are no congestion problems or other special circumstances to consider, handover-related disruption in streaming-content transmission to the device 12 should be brief and the control circuit 44 may initiate a buffer size increase and a transmission burst duration and data rate corresponding to an added one or two seconds of streaming-content playback at the device 12.

In this regard, the SCCS 40 may have knowledge of the bitrate associated with playback of the content being streamed, and can thus tailor the buffer size and transmission burst parameters in terms of added seconds of playback buffer depth. Alternatively, the control circuit 44 may initiate a size increase in the device's playback buffer specified in bytes, specified via index values which map to different buffer sizes or buffer size adjustments, etc. In an example embodiment for such cases, the control circuit 44 configures the transmission burst so that the increased-size buffer is filled within a defined target time, e.g., in seconds, subject of course to data rate limits associated with the air interface, the particular radio link(s) involved, etc.

In any case, the control circuit 44 in an example embodiment is configured to initiate the temporary increase in the size of the dynamically sizable buffer at the device 12 by sending control signaling to the device 12. Depending on where the SCCS 40 is located and depending on how it is configured, the SCCS 40 and the device 12 may operate as respective protocol endpoints for such signaling, which may be carried transparently through the RAN 24, e.g., via the base stations 28. Alternatively, the SCCS 40 signals the device 12 indirectly, such as by sending signaling to the serving base station 28 of the device 12, which in turn signals the device 12.

Such signaling also may be sent at an application-layer level, such as where the streaming-content playback application running on the device 12 receives buffer size control signaling within or in conjunction with the streaming content, and manages the buffer size accordingly. Such arrangements may be particularly useful in cases where the SCCS 40 is located in the external network(s) 14. Of course, in such cases, the SCCS 40 is configured to receive mobility information for the device 12, either directly from the device 12, or from an entity within the network 10.

The SCCS 40 is also configured to send signaling to initiate the transmission burst. In particular, in some embodiments, the control circuit 44 is configured to initiate a transmission burst of streaming content towards a wireless device 12 by sending control signaling to a source from which the streaming content is being streamed. Example sources include an external content server 16 or content cache 18, or a network-located cache 20.

The communication interface(s) 42 of the SCCS 40 in an example embodiment include the physical and/or logical processing circuitry to support these various signaling operations. In this regard, a "communication interface" will be understood as encompassing the physical-layer interface circuitry and/or the protocol processing circuitry needed to communicate towards a given node or entity. In an example case where the SCCS 40 resides within the CN 22, the communication interface(s) 42 include a communication interface 42-1 towards one or more RAN nodes, e.g., towards the base stations 28 and/or their associated network caches 20, and a communication interface 42-2 towards the external network (s) 14, e.g., for communicating with the external content server 16 or content cache 18. For example, if the CN 22 is an Evolved Packet Core or EPC, the communication interface 42-2 may be towards the "SGi" reference point of the network 10, which between the EPC and the external packet data networks represented as external network(s) 14.

The communication interface(s) 42 also may include a communication interface 42-3 towards one or more CN nodes, such as the HSS 32, the positioning node 36, the SGW/PGW 30—which may be included in the communication interface 42-2—and the billing entity 38. Thus, the communication interface 42-3 itself may comprise more than one physical interface, or at least provide signaling according to more than one protocol or data type. As noted, communications with the billing entity 38 support accounting and charging functions against subscribers whose devices 12 receive streaming-content burst transmissions as taught herein. Further, communications with the positioning node 36 represent one avenue for obtaining all or at least part of the mobility information that is used herein for determining whether to trigger a streaming-content burst transmission towards a given device 12. Additional or alternative mobility information may be obtained from the MME 34. Still further, communications with the HSS 32 provide a basis for accessing subscriber profiles 33 or other information, indicating whether and/or when streaming-content transmission control taught herein should be performed with respect to individual ones of the devices 12 operating within the network 10.

The SCCS 40 shown in the example embodiment of FIG. 2 further includes memory/storage 46. The memory/storage 46 may comprise more than one memory circuit and/or storage element, and may comprise more than one type of memory or storage. For example, the memory/storage 46 may comprise a mix of volatile, working memory such as SRAM or DRAM, and non-volatile program and configuration storage such as FLASH, EEPROM, Solid State Disk, magnetic disk, etc. Broadly, the memory/storage 46 will be understood as comprising one or more types of computer-readable medium for storing, at least temporarily, working data, computer program instructions, configuration data, etc.

In at least one embodiment, the control circuit 44 comprises a CPU and supporting circuitry, or more generally comprises one or more digital processing circuits, such as one or more microcontrollers, DSPs, FGPAs, ASICs, etc., along with supporting clock, memory and interface circuitry. Broadly, the control circuit 44 comprises dedicated circuitry, or programmable circuitry, or some combination thereof. In at least one such embodiment, the control circuit 44 comprises programmable circuitry that is programmed to implement the streaming-content transmission control taught herein, based on its execution of computer program instructions included in a computer program 48 that is stored in the memory/storage 46.

Figure 3:
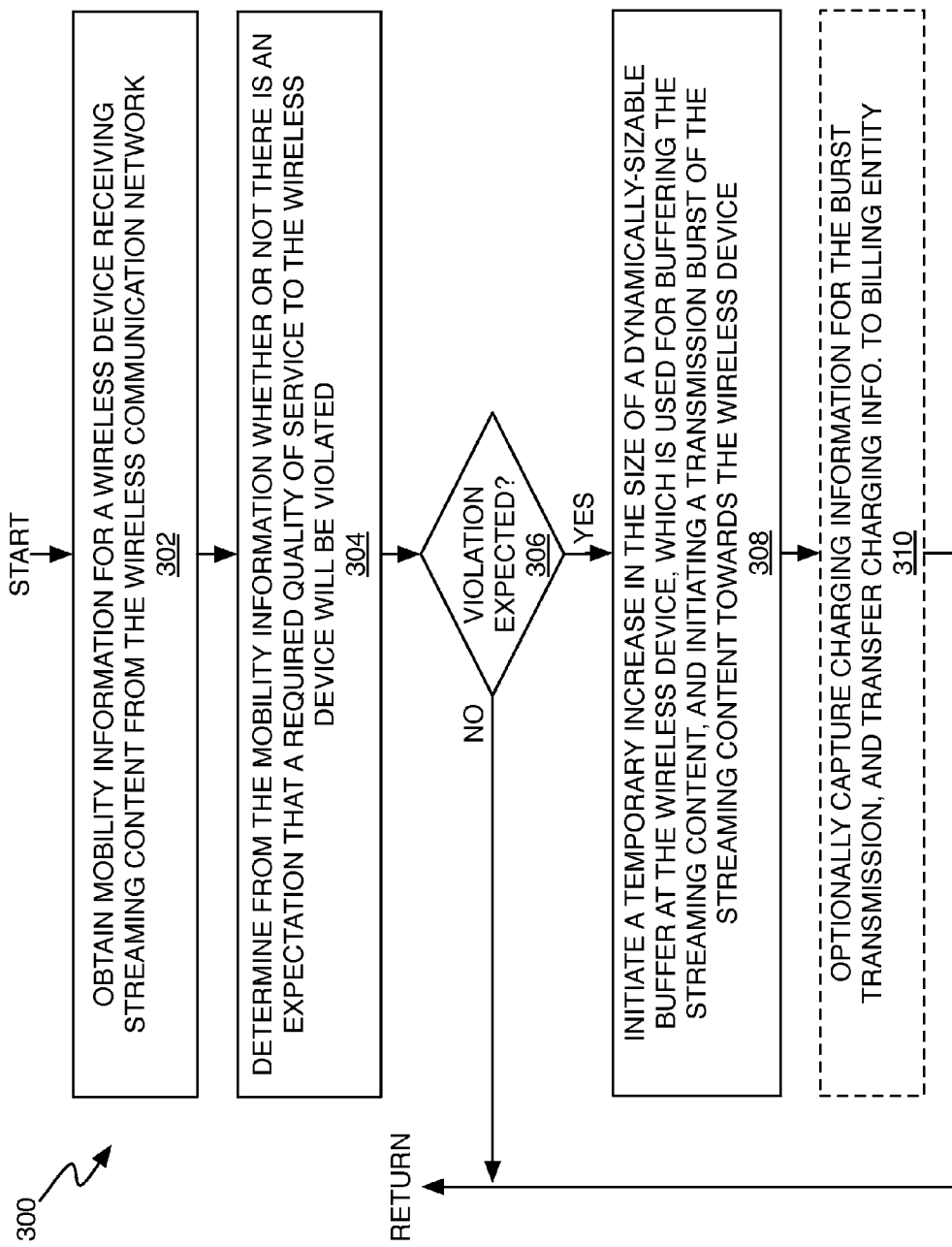
FIG. 3 is a logic flow diagram of one embodiment of a method of streaming-content transmission control, as taught herein and which may be implemented by the streaming-content control server of FIG. 1, for example.

FIG. 3 illustrates a method 300 of streaming-content transmission control, as contemplated herein according to an example embodiment, and as may be implemented in the SCCS 40, whether through fixed and/or programmed circuitry. One or more of the depicted operations may be performed in an order different than that suggested in the flow diagram and/or one or more steps may be performed in parallel, or on an ongoing or background basis. Further, the processing steps depicted as the method 300 may be repeatedly executed—looped—as needed during the duration of a streaming session towards a given device 12, and they may be performed with respect to any number of devices 12 and may represent processing that is performed as part of a larger set of processing operations carried out at the SCCS 40.

With the above points in mind, FIG. 3 depicts a method 300 of controlling the transmission of streaming content from the network 10 to a given device 12, where the method 300 includes obtaining (Block 302) mobility information for the device 12. As noted, the mobility information comprises, for example, any one or more of: handover history, handover measurement reports indicating serving and neighbor cell signal quality and/or strength, current Cell ID, cell neighbor list information, known or computed trajectories of movement or direction of travel within the network 10, and geographic and/or network service area positioning information.

The method 300 further includes determining (Block 304) from the mobility information whether or not there is an expectation that a required QoS to the device 12 will be violated with respect to the transmission of the streaming content. For example, the mobility information may indicate that the device 12 is adjacent to, or moving towards, a congested service area 26 in the network, or is adjacent to or moving towards a known gap or point of disruption within the network's coverage. As a non-limiting, specific example, the SCCS 40 may determine that that is an expected QoS violation based on receiving an indication from the MME 34 that the device 12 has been directed to perform a handover from one service area 26 to another, or has requested such a handover. Alternatively, the SCCS 40 may receive mobility measurement reports, e.g., Radio Resource Management, RRM, measurements, directly or indirectly from the device 12, and recognize impending handovers from such reports.

The QoS may be a device or subscriber specific parameter, or a general parameter known for the type of streaming content, and/or may be one or more QoS parameters specified in a subscriber profile 33, e.g., such as an indication that the subscriber is a "Gold" or premium level subscriber that has paid additional money to avoid the type temporary of streaming-content service glitches or disruptions that are addressed by the streaming-content transmission control taught herein.

Also, while not explicitly shown in the flow diagram of FIG. 3, one or more embodiments of the method 300 include a preliminary step of determining whether a given device 12 is a candidate for the streaming-content transmission control taught herein. That determination may be made at call setup, e.g., based on device capability reporting from the device 12 during Radio Resource Control, RRC, connection establishment. Alternatively, the determination may be made based on information in the associated subscriber profile 33. For example, upon or in conjunction with a given device 12 requesting streaming content, the SCCS 40 may query the HSS 32 for subscriber information based on the IMSI or other identifier of the device 12, to obtain an indication of whether streaming-content transmission control should be enabled for the device 12.

If, during the streaming-content session, the SCCS 40 determines from the mobility information that a QoS violation is expected with respect to the device 12—YES from Block 306—processing continues with initiating (Block 308) a temporary increase in the size of a dynamically-sizable buffer at the device 12, as used for buffering the streaming content. Such processing further includes correspondingly initiating a transmission burst of the streaming content towards the device 12. Optionally, or at least in some embodiments, the method 300 includes the further operation of capturing (Block 310) charging information for the transmission burst, including capturing one or more of: a duration of the transmission burst, a data rate of the transmission burst, and an amount of streaming content delivered during the transmission burst. Such processing further includes providing the charging information to a billing entity 38 associated with the network 10. Note that the "NO" path from Block 306 results in not initiating the buffer size increase and the streaming-content transmission burst.

Figure 4:
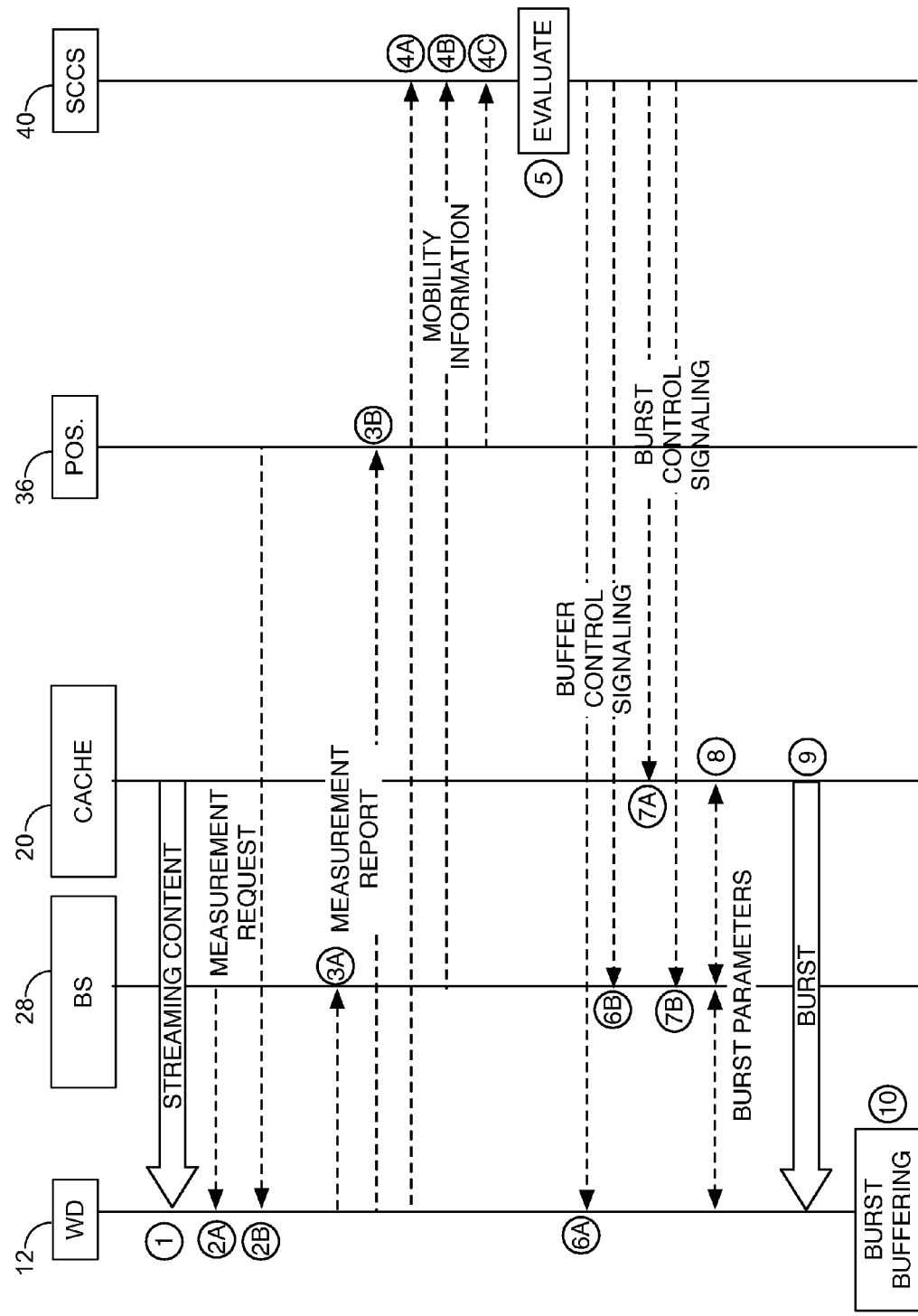
FIG. 4 depicts a signal flow diagram illustrating an example signal flow for one embodiment of streaming-content transmission control, as taught herein.

FIG. 4 depicts a signal flow according to a further example of the streaming-content transmission control contemplated herein. The flow begins (Step 1) with streaming-content transmission ongoing from a serving base station 28 to a device 12, where the streaming content is sourced from a network cache 20 that is associated with the serving base station 28. While such streaming is ongoing, the base station 28 (Step 2A) and/or a positioning node 36 (Step 2B) send a measurement request to the device 12. For example, the measurement request, if sent from the base station 28, may be a periodic or triggered RRM measurement request, requesting that the device 12 make signal quality and/or strength measurements on the serving base station 28 and on one or more neighboring base stations 28—not shown—such as are used in handover evaluation processing. If the measurement request is sent from the positioning node 36, it may be a request to make a positioning measurement on Positioning Reference Signals, PRS, or other physical layer signals.

In either case, the device 12 generates and sends a corresponding report to the serving base station 28 (Step 3A) or to the positioning node 36 (Step 3B). The same report, or information derived therefrom is sent to the SCCS 40 from the device 12 (Step 4A), or from the serving base station (Step 4B), or from the positioning node 36 (Step 4C). The SCCS 40 evaluates the mobility information (Step 5) and, in this example, the result of that evaluation is a determination by the SCCS 40 that a violation of a required QoS with respect to the device 12 is expected. For example, the SCCS 40 compares location information for the device 12 with stored network data indicating that the position or trajectory of the device 12 indicates that it is likely to enter a gap in network coverage, or otherwise pass through area of problematic reception.

In another example, the mobility information comprises serving and neighboring cell measurements and the SCCS 40 determines that handover is needed. Here, the determination that handover triggers the expectation of QoS violation may be a general determination—i.e., any imminent handover triggers the expectation that the required QoS will be violated. Alternatively, imminent handovers are evaluated in terms of which service areas 26 are involved and/or in terms of the network conditions—such as congestion or loading—in the involved service areas 26, to determine whether the handover should be considered in determining whether a QoS violation is or is not expected.

It should be noted that the base station 28 may perform handover evaluation processing in the context of FIG. 4, but such processing is not shown explicitly here. In any case, in the illustrated flow, the SCCS 40 determines that a QoS violation is expected and it sends buffer control signaling to the device 12 (Step 6A), or to the base station 28 (Step 6B), which in turns sends related signaling to the device 12, although such signaling is not shown explicitly in the diagram. The buffer control signaling will be understood as initiating and, in some embodiments, configuring the size increase of the streaming-content buffer in the device 12.

Signaling continues with the SCCS 40 sending burst control signaling to the cache 20 (Step 7A), or to the base station (Step 7B). The burst control signaling in some embodiments stipulates a burst duration and/or target burst data rate, and those or other burst parameters may be signaled between the base station 28 and the cache 20 and/or the device 12, to prepare for the streaming-content transmission burst (Step 8). As those of ordinary skill in the art will appreciate, the base station 28 may adapt its scheduling for the device 12 and other devices 12 being served, in order to accommodate the transmission burst, and corresponding scheduling signaling, Modulation and Coding Scheme, MCS, and other such information may be sent to the device 12, to configure it for proper reception of the transmission burst. The transmission burst occurs at Step 9, and the device 12 performs burst buffering (Step 10) in association with receiving the transmission burst. Reception of the transmission burst increases the amount of buffered streaming content at the device 12 over the maximum depth that could have been achieved at the device 12 before dynamic buffer size increase.

Figure 5:
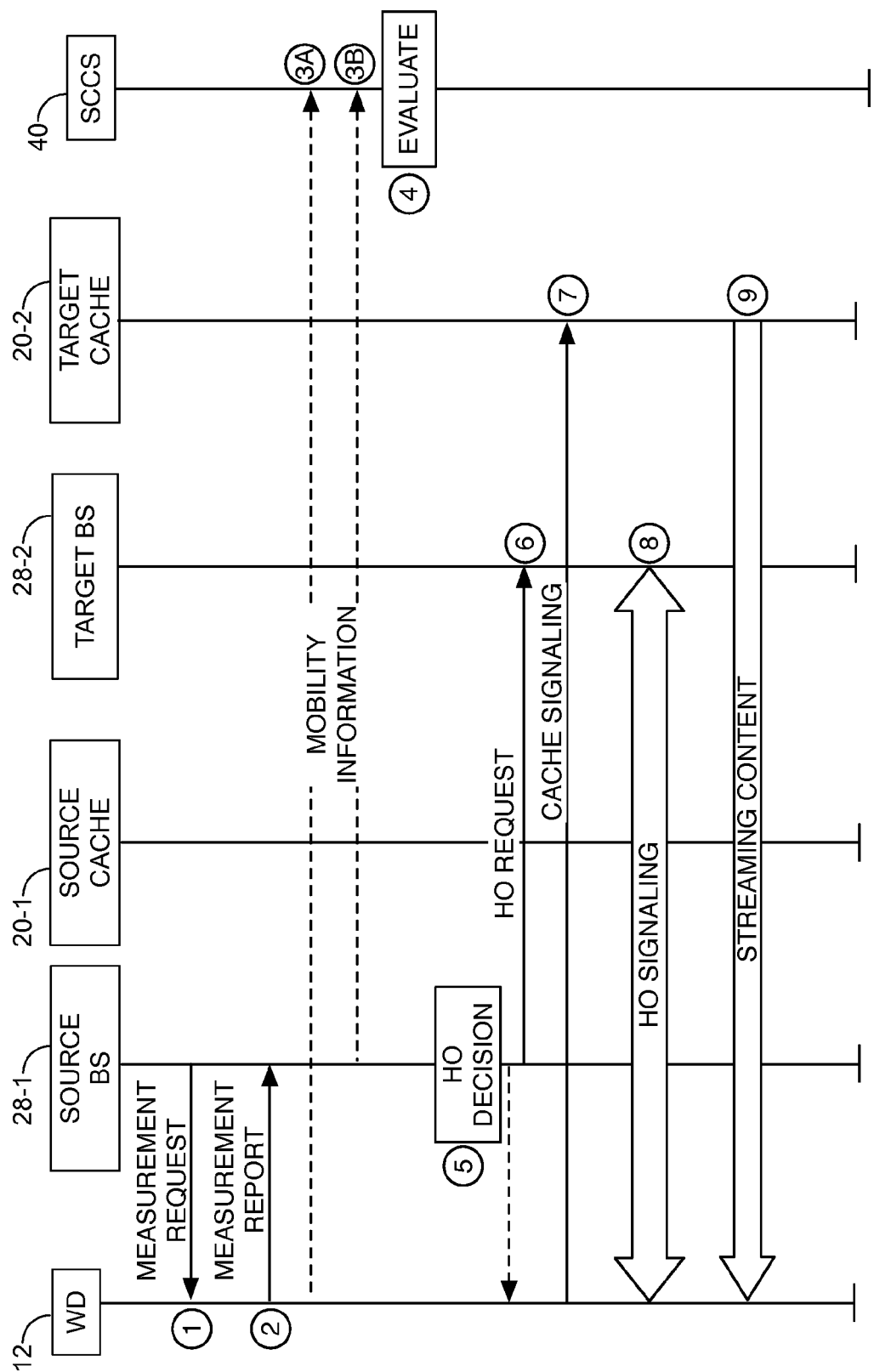
FIG. 5 depicts a signal flow diagram illustrating another example signal flow for another embodiment of streaming-content transmission control, as taught herein.

FIG. 5 can be understood as continuing with the same device 12 as discussed in the context of FIG. 4. Here, the serving base station 28 is referred to as the source base station 28-1 and its associated cache 20 is referred to as the source cache 20-1. Because the diagram is presented as an example of processing in the context of handover, a second base station 28 and its associated cache 20 are shown as a target base station 28-2 and a target cache 20-2. Here, "target" denotes handover target.

Processing begins with the source base station 28-1 sending a measurement request (Step 1), e.g., a pilot strength measurement report for serving and neighboring base stations 28, such as discussed earlier. The device 12 sends a corresponding report (Step 2), and the same report or information derived therefrom is sent as mobility information to the SCCS 40, either from the device 12 at Step 3A, or from the source base station 28-1 at Step 3B.

The SCCS 40 evaluates the mobility information (Step 4) and it will be understood that the source base station 28-1 generally will make its own evaluation of that information for making the handover decision (Step 5). Here, the source base station 28-1 decides to initiate a handover of the device 12 to the target base station 28-2 and sends a handover signaling (Step 6). In turn, the device 12 sends streaming-content signaling—cache signaling—towards the target cache 20-2 in preparation for the handover (Step 7), then handover signaling is carried out between the target base station 28-2 and the device 12 (Step 8), resulting in the streaming content transmission to the device 12 being continued, but now sourced from the target cache 20-2 rather than from the source cache 20-1 (Step 9).

Of particular interest in the above signal flow, one sees that the evaluation of the mobility information by the SCCS 40 does not result in the SCCS 40 determining that a violation is expected with respect to the required QoS. In particular, the diagram illustrates an example case where handover from the source base station 28-1 to the target base station 28-2 does not trigger a streaming-content transmission burst. That is, as explained earlier, the streaming-content transmission control may be configured to initiate a buffer size increase and a transmission burst responsive to detecting that a handover is imminent, but in other embodiments, it may be that only a particular type of handover triggers such operations. Additionally, or alternatively, only handovers involving certain service areas 26 trigger such operations and/or only handovers into service areas 26 having congestion levels above a certain threshold trigger such operations.

This latter case is an example of a trigger criterion at issue in some embodiments of the streaming-content transmission control taught herein. Namely, in such embodiments, the SCCS 40 is aware of the bandwidth available before and after a prospective handover, and is further aware of the device's buffer capabilities, and such knowledge can be used to refine the decision as to whether or not to initiate a buffer size increase and a corresponding burst transmission. Further, in some sense, the SCCS 40 is aware of device locations and the different locations of the caches 20 within the network 10. Location information, which falls broadly under the term "mobility information", as used herein, may encompasses not only a current location or history of locations, but also information indicating an expected location—e.g., predictable from the device's direction of movement or trajectory.

The contemplated teachings provide subscribers or end users with a higher and more consistent quality of experience when roaming. The SCCS 40 in this regard is responsible for knowing the applicable subscriber profile information, the particular streaming content being consumed by given ones of the devices 12, the mobility information of those given devices, and the location and contents of the current and next network caches 20 that are being used and will be used to source the streaming content. Such operations reduce the bandwidth requirements within the network 10 and/or provide improved streaming content delivery to subscribers.

Among other items considered by the SCCS 40 in performing streaming-content transmission control as taught herein, the SCCS 40 may consider any one or more of the following with respect to a given device 12: the subscriber profile 33; the device capabilities; the particular streaming-content being consumed; roaming information; the current or expected location information such as may be known from GPS, direction of travel, movement history, e.g., prior locations at given times/dates; the location, contents, etc. of the involved network caches 20; and available network bandwidth and/or congestion levels in the involved service areas 26. Also, note that any premium charges assessed for bursting streaming content towards a given device 12 can be overlaid with the regular charging data, e.g., during offline post processing.

Figure 6:
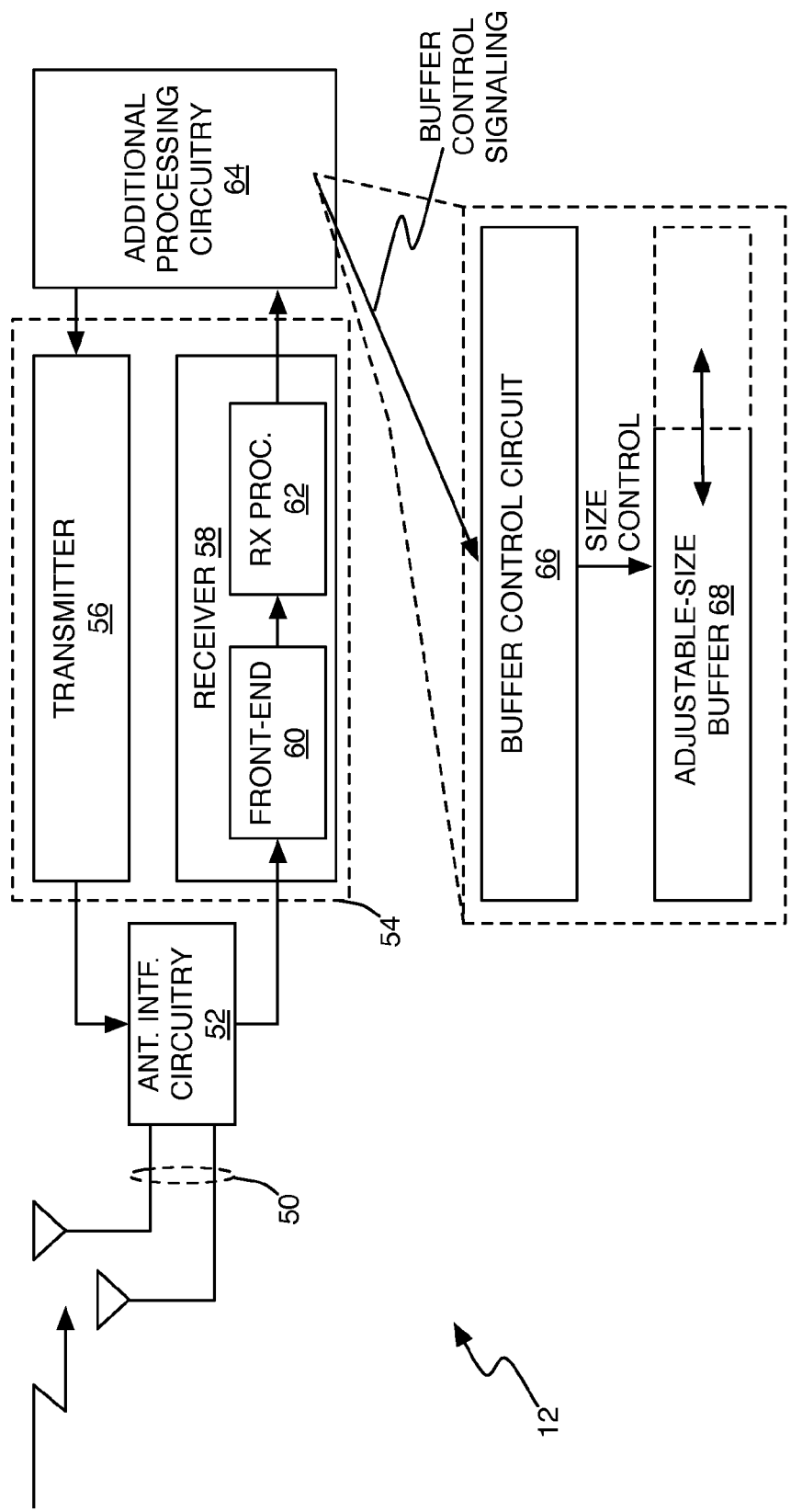
FIG. 6 is a block diagram of one embodiment of a wireless device, such as a 3GPP User Equipment or UE, in an example implementation.

FIG. 6 illustrates an example device 12, which includes one or more receive/transmit antennas 50, antenna interface circuitry 52, and transceiver circuitry 54, which includes a transmitter 56 and a receiver 58, including a receiver front-end 60 and a receiver processor 62. Depending on its intended use and features, the device 12 includes additional processing circuitry 64, which may include one or more application processors, e.g., a music or media player application that allows a user of the device 12 to playback streaming content. In this regard, while not explicitly shown in the diagram, the device 12 includes a user interface, such as a touchscreen, speakers, etc.

The additional processing circuitry 64 further includes a buffer control circuit 66 that is configured to provide dynamic size control for an adjustable-size buffer 68. For example, the DL signaling received by the device 10 includes buffer control signaling that is interpreted by the buffer control circuit 66 as size control commands. In at least one embodiment, the buffer control circuit 66 implements a default buffer size or depth that is, say, one-half of the maximum depth available in the adjustable-size buffer 68. The SCCS 40 can then dynamically increase buffer size increases, e.g., predefined step size increases, up to the maximum buffer depth, when needed to accommodate the streaming content sent to the device 12 in a streaming-content transmission burst.

It should also be noted that the SCCS 40 in one or more embodiments is configured to send size reduction signaling to the device 12, after completing the burst transmission, so that the device 12 returns to operation with a nominal or default-sized buffer. Of course, different types of devices 12 may have different default and/or maximum buffer sizes, and the control signaling generated by the SCCS 40 for increasing or decreasing the operative buffer size in use at a given device 12 may be tailored to the buffer characteristics of that device 12, or devices 12 may be configured to adapt generic buffer size control commands to their particular buffer implementations.

Broadly, then, according to the teachings herein, a wireless device 12 has a dynamic buffer whose size is controlled in conjunction with a network entity. The network entity can adjust the size of the buffer to account for network conditions. In particular, based on knowledge of an individual device's location, trajectory, and QoS agreements, the network entity can determine that the device 12 is likely to encounter a network service interruption—e.g., pass through a dead zone or undergo a handover across two different Radio Access Technologies, RATs, e.g., from HSPA to LTE, or from LTE to WiFi. In anticipation of the network interruption or service degradation, the network entity will dynamically increase the buffer size of the device and initiate transmission of a burst of streaming-content traffic, so that the device 12 has sufficient buffered content to traverse the service degradation/service interruption.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of controlling the transmission of streaming content from a wireless communication network to a wireless device, said method comprising:
   obtaining mobility information for the wireless device;
   determining from the mobility information whether or not there is an expectation that a required quality of service to the wireless device will be violated with respect to the transmission of the streaming content; and
   initiating a temporary increase in the size of a dynamically-sizable buffer at the wireless device used for buffering the streaming content and correspondingly initiating a transmission burst of the streaming content towards the wireless device, when there is the expectation that the required quality of service to the wireless device will be violated.

2. The method of claim 1, further comprising determining the required quality of service from a subscriber profile associated with the wireless device, wherein the subscriber profile stipulates one or more Quality-of-Service (QoS) guarantees for the transmission of the streaming content to the wireless device.

3. The method of claim 1, further comprising:
   capturing charging information for the transmission burst, including capturing one or more of: a duration of the transmission burst, a data rate of the transmission burst, and an amount of streaming content delivered during the transmission burst; and
   providing the charging information to a billing entity associated with the wireless communication network.

4. The method of claim 1, wherein the mobility information indicates a trajectory of the wireless device within the wireless communication network.

5. The method of claim 4, wherein determining from the mobility information whether or not there is an expectation that the required quality of service will be violated comprises determining from the mobility information that the wireless device will or is expected to imminently undergo a handover from one service area to another service area.

6. The method of claim 4, wherein determining from the mobility information whether or not there is an expectation that the required quality of service will be violated comprises determining from the mobility information that the wireless device will or is expected to imminently undergo a handover from an uncongested service area to a congested service area.

7. The method of claim 1, wherein determining from the mobility information whether or not there is an expectation that the required quality of service will be violated comprises determining from the mobility information that a potential violation of the required quality of service is imminent, based on known network conditions relative to a known or expected position of the wireless device, as determined from the mobility information.

8. The method of claim 1, further comprising controlling one or more parameters of the transmission burst based a known or expected duration of the expected violation of the required quality of service to the wireless device.

9. The method of claim 1, wherein initiating the temporary increase in the size of the dynamically sizable buffer at the wireless device comprises sending control signaling to the wireless device.

10. The method of claim 1, wherein initiating the transmission burst of the streaming content towards the wireless device comprises sending control signaling to a streaming-content server or a streaming-content cache from which the streaming content is being streamed.

11. A streaming-content control server configured for controlling the transmission of streaming content from a wireless communication network to a wireless device, said streaming-content control server comprising:
   one or more communication interfaces configured for communicating with the wireless device and a source of the streaming content being transmitted to the wireless device; and
   a control circuit that is operatively associated with the one or more communication interfaces and configured to:
   obtain mobility information for the wireless device;
   determine from the mobility information whether or not there is an expectation that a required quality of service to the wireless device will be violated with respect to the transmission of the streaming content; and
   initiate a temporary increase in the size of a dynamically-sizable buffer at the wireless device used for buffering the streaming content and correspondingly initiate a transmission burst of the streaming content towards the wireless device, when there is the expectation that the required quality of service to the wireless device will be violated.

12. The streaming-content control server of claim 11, wherein the control circuit is further configured to determine the required quality of service from a subscriber profile associated with the wireless device, wherein the subscriber profile stipulates one or more Quality-of-Service (QoS) guarantees for the transmission of the streaming content to the wireless device.

13. The streaming-content control server of claim 11, wherein the control circuit is further configured to:
 capture charging information for the transmission burst, including capturing one or more of: a duration of the transmission burst, a data rate of the transmission burst, and an amount of streaming content delivered during the transmission burst; and
 provide the charging information to a billing entity associated with the wireless communication network.

14. The streaming-content control server of claim 11, wherein the mobility information indicates a trajectory of the wireless device within the wireless communication network.

15. The streaming-content control server of claim 14, wherein the control circuit is configured to determine from the mobility information whether or not there is an expectation that the required quality of service will be violated, based on determining from the mobility information that the wireless device will or is expected to imminently undergo a handover from one service area to another service area.

16. The streaming-content control server of claim 14, wherein the control circuit is further configured to determine from the mobility information whether or not there is an expectation that the required quality of service will be violated, based on determining from the mobility information that the wireless device will or is expected to imminently undergo a handover from an uncongested service area to a congested service area.

17. The streaming-content control server of claim 11, wherein the control circuit is further configured to determine from the mobility information whether or not there is an expectation that the required quality of service will be violated, based on detecting from the mobility information that a potential violation of the required quality of service is imminent, according to known network conditions relative to a known or expected position of the wireless device, as determined from the mobility information.

18. The streaming-content control server of claim 11, wherein the control circuit is further configured to control one or more parameters of the transmission burst based a known or expected duration of the expected violation of the required quality of service to the wireless device.

19. The streaming-content control server of claim 11, wherein the control circuit is configured to initiate the temporary increase in the size of the dynamically sizable buffer at the wireless device by sending control signaling to the wireless device.

20. The streaming-content control server of claim 11, wherein the control circuit is configured to initiate the transmission burst of the streaming content towards the wireless device by sending control signaling to a source from which the streaming content is being streamed.

* * * * *